(12) United States Patent  
Wakita et al.

(10) Patent No.: US 10,403,926 B2  
(45) Date of Patent: *Sep. 3, 2019

(54) NONAQUEOUS ELECTROLYTE SECONDARY BATTERY

(71) Applicant: Murata Manufacturing Co., Ltd., Kyoto (JP)

(72) Inventors: Shinya Wakita, Fukushima (JP); Masayuki Ihara, Fukushima (JP); Masanori Soma, Fukushima (JP); Izaya Okae, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,725

(22) Filed: Nov. 15, 2017

(65) Prior Publication Data

US 2018/0076476 A1 Mar. 15, 2018

Related U.S. Application Data

(63) Continuation of application No. 12/710,036, filed on Feb. 22, 2010, now Pat. No. 9,843,068.

(30) Foreign Application Priority Data

Feb. 27, 2009 (JP) .................. 2009-046651

(51) Int. Cl.
| | |
|---|---|
| *H01M 10/052* | (2010.01) |
| *H01M 10/0566* | (2010.01) |
| *H01M 10/0567* | (2010.01) |
| *H01M 4/02* | (2006.01) |
| *H01M 4/36* | (2006.01) |
| *H01M 4/58* | (2010.01) |

(52) U.S. Cl.
CPC ......... *H01M 10/052* (2013.01); *H01M 4/366* (2013.01); *H01M 4/5825* (2013.01); *H01M 10/0566* (2013.01); *H01M 10/0567* (2013.01); *H01M 2004/028* (2013.01); *H01M 2300/0045* (2013.01); *H01M 2300/0091* (2013.01)

(58) Field of Classification Search
CPC ............... H01M 10/0567; H01M 2004/028
See application file for complete search history.

(56) References Cited

U.S. PATENT DOCUMENTS

| 8,197,964 | B2 * | 6/2012 | Saito ............. | H01M 4/587 429/199 |
| 9,225,021 | B2 * | 12/2015 | Wakita ............. | H01M 4/5825 |
| 9,509,015 | B2 * | 11/2016 | Saito ............. | H01M 4/587 |
| 9,843,068 | B2 * | 12/2017 | Wakita ............. | H01M 10/0566 |
| 2008/0096112 | A1 | 4/2008 | Ihara et al. | |
| 2008/0206649 | A1 * | 8/2008 | Kawashima ....... | H01M 6/168 429/324 |
| 2008/0254368 | A1 | 10/2008 | Ooyama et al. | |
| 2009/0017374 | A1 * | 1/2009 | Saito ............. | H01M 4/587 429/199 |
| 2012/0178621 | A1 | 7/2012 | Elliott | |

FOREIGN PATENT DOCUMENTS

| JP | 4-250919 | 9/1992 |
| JP | 8-321313 | 12/1996 |
| JP | 09-259863 | 10/1997 |
| JP | 2001-223011 | 8/2001 |
| JP | 2001-313071 | 11/2001 |
| JP | 2002-134170 | 5/2002 |
| JP | 2004-022336 | 1/2004 |
| JP | 2004-281368 | 10/2004 |
| JP | 3658517 | 3/2005 |
| JP | 2005-243301 | 9/2005 |

(Continued)

OTHER PUBLICATIONS

Japanese Office Action dated Jun. 28, 2011 for corresponding Application No. 2009-046651.
Korean IPTAB Decision in corresponding Korean Application.

*Primary Examiner* — Melissa A Rioja
(74) *Attorney, Agent, or Firm* — K&L Gates LLP

(57) ABSTRACT

A nonaqueous electrolyte secondary battery includes a positive electrode having a positive electrode active material layer provided on a positive electrode collector, a negative electrode having a negative electrode active material layer provided on a negative electrode collector, and a nonaqueous electrolyte. The nonaqueous electrolyte contains at least one member selected from the group consisting of sulfone compounds represented by the following formulae (1) and (2); and an inorganic phosphorus compound represented by the following formula (3) exists on the surface of a positive electrode active material:

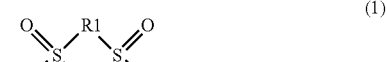

(1)

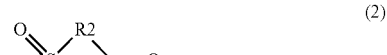

(2)

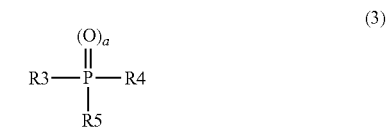

(3)

R1 represents $C_mH_{2m-n1}X_{n2}$; X represents a halogen; m represents an integer of from 2 to 7; each of n1 and n2 independently represents an integer of from 0 to 2m; R2 represents $C_jH_{2j-k1}Z_{k2}$; Z represents a halogen; j represents an integer of from 2 to 7; each of k1 and k2 independently represents an integer of from 0 to 2j; each of R3, R4 and R5 independently represents H or OH; and a is 0 or 1.

3 Claims, 2 Drawing Sheets

(56) References Cited

FOREIGN PATENT DOCUMENTS

| | | |
|---|---:|---:|
| JP | 4026288 | 10/2007 |
| JP | 4033074 | 11/2007 |
| JP | 2008-021624 | 1/2008 |
| JP | 2008-041635 | 2/2008 |
| JP | 2008-98053 | 4/2008 |
| KR | 10-20090005973 | 1/2009 |
| WO | 2007/139130 | 12/2007 |

\* cited by examiner

NONAQUEOUS ELECTROLYTE SECONDARY BATTERY

CROSS REFERENCES TO RELATED APPLICATIONS

The present application is a continuation application of U.S. patent application Ser. No. 12/710,036, filed on Feb. 22, 2010, which application claims priority to Japanese Priority Patent Application JP 2009-046651 filed in the Japan Patent Office on Feb. 27, 2009, the entire content of which is hereby incorporated by reference.

BACKGROUND

The present disclosure relates to a nonaqueous electrolyte secondary battery.

Among nonaqueous electrolyte batteries, a lithium ion secondary battery is rapidly developing as a power source of portable electronic appliances such as a mobile phone and a portable personal computer. In the power source for such a portable electronic appliance, an energy density, namely an energy storage capacity per unit volume is the most necessary characteristic, and how long the portable appliance can be used attracts interest.

JP-A-2004-22336 discloses that a lithium secondary battery having not only excellent characteristics in energy density, electromotive force and the like but excellent cycle life and safety is obtained using an electrolytic solution in which a sulfonic anhydride is contained in an aprotic organic solvent.

JP-A-2002-134170 discloses that in a nonaqueous electrolytic solution secondary battery using a cobalt-containing positive electrode active material, when a compound capable of forming a complex with cobalt is added to an electrolytic solution, a cobalt ion eluted in the electrolytic solution is stabilized, and its deposition on a negative electrode is suppressed, thereby reducing a reaction area of the negative electrode and suppressing the generation of a gas to be caused due to a catalytic reaction of cobalt; thus, a nonaqueous electrolytic solution secondary battery which is excellent in high-temperature storage characteristic and high-temperature charge and discharge cycle characteristic can be provided.

However, for example, when a portable personal computer is allowed to stand in a continuously connected state to a power source, the battery within a battery pack is exposed in a charged state (floating state), and the battery capacity is abruptly deteriorated. This is caused due to the fact that cobalt or the like which is contained in the positive electrode active material is easily eluted in an oxidizing atmosphere, and at the same time when the interfacial resistance increases, the capacity is lowered by a change in the layered structure. Furthermore, an increase in the circumferential temperature following drive of the portable personal computer is a factor in acceleration of the deterioration.

Also, there is involved a problem that when the battery is exposed in a charged state (floating state), a gas is generated due to a reaction between the electrolytic solution and the positive electrode active material, thereby causing blister of the battery, resulting in a lowering of the quality.

As reform measures, there is a technology in which even when Co is eluted from a lithium cobalt complex oxide, the battery is stabilized by an additive of the electrolytic solution, thereby avoiding an adverse influence against the negative electrode. However, though the adverse influence against the negative electrode to be caused due to the elution of Co can be avoided, the positive electrode resistance increases by a change in the positive electrode structure, and the capacity is deteriorated. Namely, a battery with high reliability is not obtainable unless the own elution of Co is suppressed. A phenomenon of the elution of a metal ion is common in not only the lithium cobalt complex oxide but nickel oxides, manganese oxides, iron olivine phosphates and so on.

That is, a nonaqueous electrolyte secondary battery which is further excellent in a floating characteristic is being desired.

It is therefore desirable to provide a nonaqueous electrolyte secondary battery which is excellent in a floating characteristic.

SUMMARY

According to an embodiment, there is provided a nonaqueous electrolyte secondary battery including: a positive electrode having a positive electrode active material layer provided on a positive electrode collector; a negative electrode having a negative electrode active material layer provided on a negative electrode collector; and a nonaqueous electrolyte, wherein the nonaqueous electrolyte contains at least one member selected from the group consisting of sulfone compounds represented by the following formulae (1) and (2); and an inorganic phosphorus compound represented by the following formula (3) exists on the surface of a positive electrode active material.

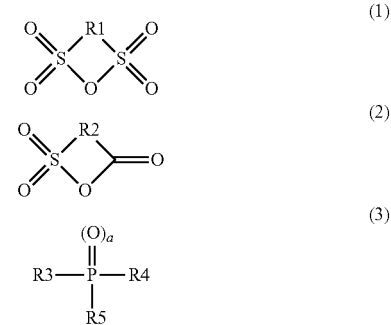

In the foregoing formulae (1) to (3), R1 represents $C_mH_{2m-n1}X_{n2}$; X represents a halogen; m represents an integer of from 2 to 7; each of n1 and n2 independently represents an integer of from 0 to 2m; R2 represents $C_jH_{2j-k1}Z_{k2}$; Z represents a halogen; j represents an integer of from 2 to 7; each of k1 and k2 independently represents an integer of from 0 to 2j; each of R3, R4 and R5 independently represents H or OH; and a is 0 or 1.

The term "nonaqueous electrolyte" as referred to in the specification of this application includes both a nonaqueous electrolyte in a liquid form and a nonaqueous electrolyte in a gel form.

In an embodiment, it is required that the inorganic phosphorus compound represented by the formula (3) exists at least on the surface of a positive electrode active material. As to this existent mode, it is sufficient that the inorganic phosphorus compound exists on at least a part of the surface of the positive electrode active material, and the inorganic phosphorus compound may exist on the whole surface of the positive electrode active material. Also, the inorganic phosphorus compound may exist on other place than the surface of the positive electrode active material.

According to an embodiment, since the nonaqueous electrolyte contains the foregoing sulfone compound, a favorable protective film is formed on the surface of the positive electrode active material at the initial charge so that even when exposed in a charging atmosphere, the own elution of a metal can be suppressed. Also, since that the inorganic phosphorus compound is contained on the surface of the positive electrode active material, even when exposed in a charging atmosphere, it is possible to prevent the generation of a gas to be caused due to secondary decomposition of the nonaqueous electrolyte on the surface of the active material. According to this, it is possible to obtain a lithium ion secondary battery which is low in deterioration in an actual use atmosphere of an actual portable personal computer or the like.

Additional features and advantages are described herein, and will be apparent from the following Detailed Description and the figures.

DETAILED DESCRIPTION

Figure 1:
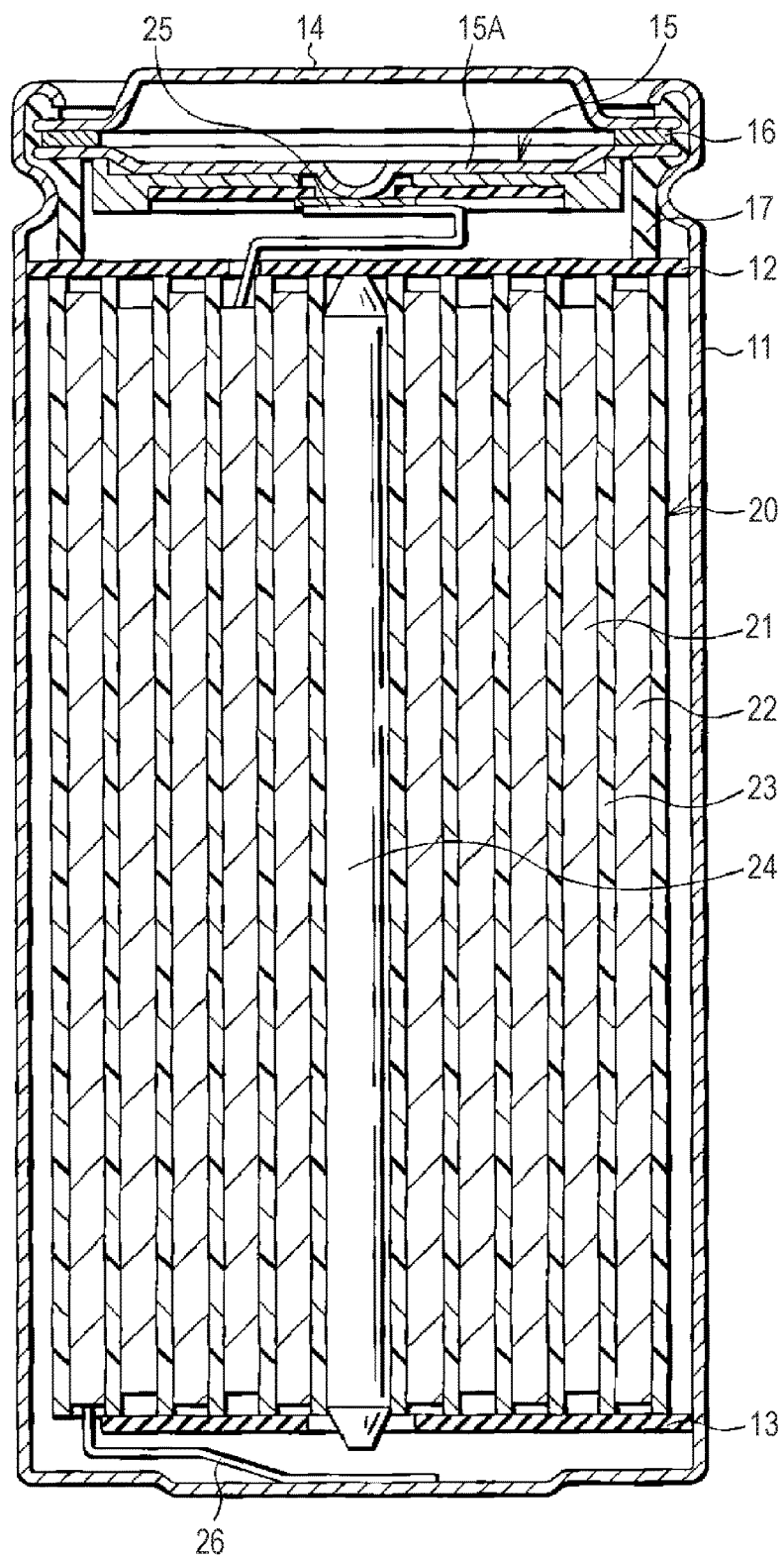
FIG. 1 is a sectional view showing a configuration of a secondary battery according to an embodiment.

Embodiments are hereunder described in detail. In the specification of this application, the term "%" means % by mass unless otherwise indicated.

The nonaqueous electrolyte is hereunder described.

First of all, the sulfone compound is described.

The nonaqueous electrolyte contains at least one member selected from the group consisting of sulfone compounds represented by the formulae (1) and (2). That is, the nonaqueous electrolyte may contain only a sulfone compound represented by the formula (1) or may contain only a sulfone compound represented by the formula (2) or may contain both of them. In each of the cases, one or more kinds can be used on the structural basis. The sulfone compound represented by the formula (1) is also referred to as "sulfone compound (1)". The same is applicable to the formula (2) or the like. Also, in the case where it is meant that the both are contained, the compounds are also referred to merely as "sulfone compound". A content of the sulfone compound in the nonaqueous electrolyte is preferably from 0.01 to 1.0% by mass relative to the nonaqueous electrolyte (here, the sulfone compound is not included in the nonaqueous electrolyte). This is because when the content of the sulfone compound exceeds 1.0% by mass, the positive electrode film becomes thick, and the film resistance becomes excessively large. When the content of the sulfone compound is less than 0.01% by mass, it may be impossible to attain the desired effects.

The sulfone compound (1) is hereunder described.

R1 represents $C_mH_{2m-n1}X_{n2}$; m represents an integer of from 2 to 7, and preferably an integer of from 2 to 3; each of n1 and n2 independently represents an integer of from 0 to 2m, and preferably an integer of from 4 to 6; and X represents a halogen, and preferably fluorine or chlorine. R1 may be linear, branched or cyclic and may be saturated or unsaturated; and R1 is preferably saturated and linear.

Specific examples of the sulfone compound (1) are given below, but it should not be construed that an embodiment is limited thereto.

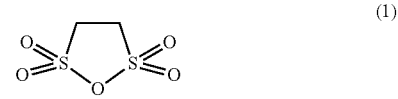

(1)

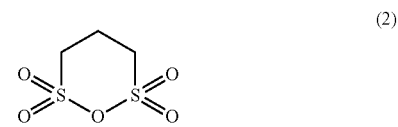

(2)

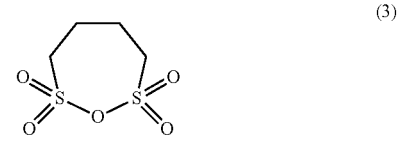

(3)

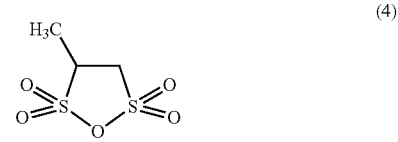

(4)

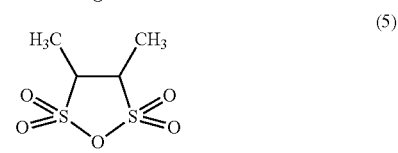

(5)

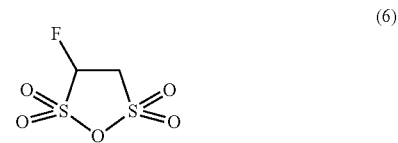

(6)

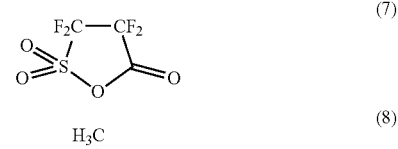

(7)

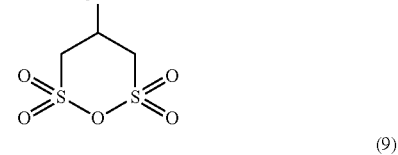

(8)

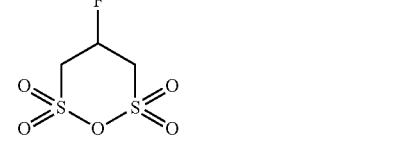

(9)

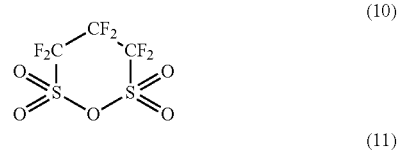

(10)

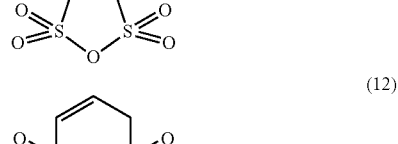

(11)

(12)

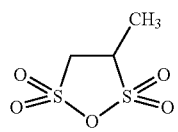 (13)

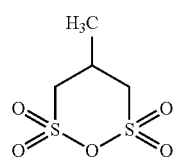 (14)

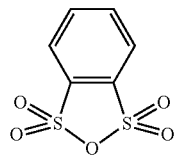 (15)

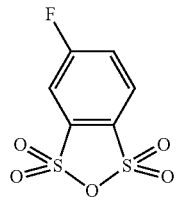 (16)

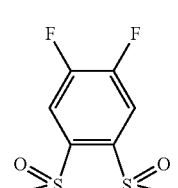 (17)

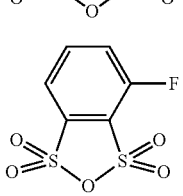 (18)

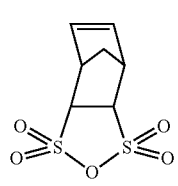 (19)

The sulfone compound (1) is especially preferably a compound represented by the following formula (1-1).

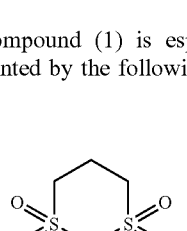 (1-1)

The sulfone compound (2) is hereunder described.

R2 represents $C_jH_{2j-k1}Z_{k2}$; j represents an integer of from 2 to 7, and preferably an integer of from 2 to 3; and each of k1 and k2 independently represents an integer of from 0 to 2j, and an integer of from 4 to 6. Z represents a halogen, and preferably fluorine or chlorine. R2 may be linear, branched or cyclic and may be saturated or unsaturated; and R2 is preferably saturated and linear.

Specific examples of the sulfone compound (2) are given below, but it should not be construed that an embodiment is limited thereto.

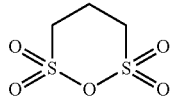 (1)

 (2)

 (3)

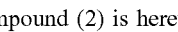 (4)

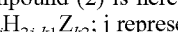 (5)

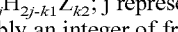 (6)

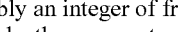 (7)

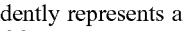 (8)

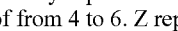 (9)

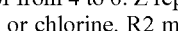 (10)

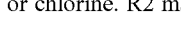 (11)

(12)

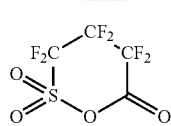

(13)

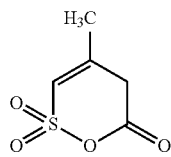

(14)

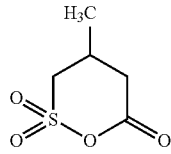

(15)

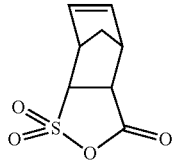

ext, the inorganic phosphorus compound represented by the formula (3), which is used in an embodiment according to the present embodiment, is described.

Each of R3, R4 and R5 independently represents H or OH; and a is 0 or 1. The inorganic phosphorus compound is preferably a compound represented by the following formula (3-1) (phosphonic acid) or a compound represented by the following formula (3-2) (phosphorous acid).

$$\underset{\substack{\text{O} \\ \|\\ \text{H}-\text{P}-\text{OH}\\|\\ \text{OH}}}{} \quad (3\text{-}1)$$

$$\text{HO}-\underset{\substack{|\\ \text{OH}}}{\text{P}}-\text{OH} \quad (3\text{-}1)$$

The inorganic phosphorus compound represented by the formula (3) can be used singly or in admixture of plural kinds thereof.

In an embodiment, the inorganic phosphorus compound represented by the formula (3) must exist on the surface of a positive electrode active material. A measure thereof is not particularly limited, and examples thereof include a method of bringing the inorganic phosphorus compound directly or as a solution into contact with the positive electrode active material and a method of adding the inorganic phosphorus compound to a positive electrode mixture coating solution.

The inorganic phosphorus compound is preferably used in an amount of from 0.01 to 1.0% by mass relative to the positive electrode mixture. When the amount of the inorganic phosphorus compound falls within the foregoing range, the decomposition of the nonaqueous electrolyte can be effectively suppressed.

The positive electrode mixture as referred to herein is a coating solution for forming the positive electrode active material layer, from which a solvent has been eliminated (however, the inorganic phosphorus compound is not included in the positive electrode mixture).

The nonaqueous electrolyte contains a solvent and an electrolyte salt. Examples of the solvent include ambient temperature molten salts such as 4-fluoro-1,3-dioxolan-2-one (FEC), ethylene carbonate, propylene carbonate, butylene carbonate, vinylene carbonate (VC), dimethyl carbonate, diethyl carbonate, ethyl methyl carbonate, γ-butyrolactone, γ-valerolactone, 1,2-dimethoxyethane, tetrahydrofuran, 2-methyltetrahydrofuran, 1,3-dioxolan, 4-methyl-1,3-dioxolan, methyl acetate, methyl propionate, ethyl propionate, acetonitrile, glutaronitrile, adiponitrile, methoxyacetonitrile, 3-methoxypropyronitrile, N,N-dimethylformamide, N-methylpyrrolidinone, N-methyloxazolidinone, nitromethane, nitroethane, sulfolane, dimethyl sulfoxide, trimethyl phosphate, triethyl phosphate, ethylene sulfide and trimethylhexylammonium bistrifluoromethylsulfonylimide. Above all, the use of a mixture with at least one member selected from the group consisting of 4-fluoro-1,3-dioxolan-2-one, ethylene carbonate, propylene carbonate, vinylene carbonate, dimethyl carbonate, ethyl methyl carbonate and ethylene sulfide is preferable because excellent charge and discharge capacity characteristic and charge and discharge cycle characteristic can be obtained.

As to the electrolyte salt which is contained in the nonaqueous electrolyte, a single kind material or a mixture of two or more kinds of materials may be contained. Examples of the electrolyte salt include lithium hexafluorophosphate ($LiPF_6$), lithium bis(pentafluoroethanesulfonyl)imide ($Li(C_2F_5SO_2)_2N$), lithium perchlorate ($LiClO_4$), lithium hexafluoroarsenate ($LiAsF_6$), lithium tetrafluoroborate ($LiBF_4$), lithium trifluoromethanesulfonate ($LiSO_3CF_3$), lithium bis(trifluoromethanesulfonyl)imide ($Li(CF_3SO_2)_2N$), tris(trifluoromethanesulfonyl)methyl lithium ($LiC(SO_2CF_3)_3$), lithium chloride (LiCl) and lithium bromide (LiBr).

Embodiments are hereunder described in detail with reference to the accompanying drawings.

FIG. 1 shows a sectional structure of a secondary battery according to an embodiment. This secondary battery is of a so-called cylinder type and has a wound electrode body 20 in which strip-shaped positive electrode 21 and negative electrode 22 are wound via a separator 23 in the inside of a battery can 11 in a substantially hollow column shape. The battery can 11 is constituted of, for example, iron (Fe) plated with nickel (Ni), and one end of the battery can 11 is closed, with the other end being opened. A pair of insulating plates 12 and 13 is respectively disposed perpendicular to the winding peripheral face in the inside of the battery can 11 so as to interpose the wound electrode body 20 therebetween.

In the open end of the battery can 11, a battery lid 14 is installed by caulking with a safety valve mechanism 15 and a positive temperature coefficient device (PTC device) 16 provided in the inside of this battery lid 14 via a gasket 17, and the inside of the battery can 11 is hermetically sealed. The battery lid 14 is constituted of, for example, a material the same as that in the battery can 11. The safety valve mechanism 15 is electrically connected to the battery lid 14 via the positive temperature coefficient device 16. In the case where the pressure in the inside of the battery reaches a fixed value or more due to an internal short circuit or heating from the outside or the like, a disc plate 15A is reversed, whereby electrical connection between the battery lid 14 and the wound electrode body 20 is disconnected. When the temperature increases, the positive temperature coefficient device 16 controls the current due to an increase of a resistance value, thereby preventing abnormal heat generation to be caused due to a large current. The gasket 17 is constituted of, for example, an insulating material, and asphalt is coated on the surface thereof.

A center pin 24 is inserted on the center of the wound electrode body 20. In the wound electrode body 20, a positive electrode lead 25 made of aluminum (Al) or the like is connected to the positive electrode 21; and a negative electrode lead 26 made of nickel or the like is connected to the negative electrode 22. The positive electrode lead 25 is electrically connected to the battery lid 14 by means of welding with the safety valve mechanism 15; and the negative electrode lead 26 is electrically connected to the battery can 11 by means of welding.

Figure 2:
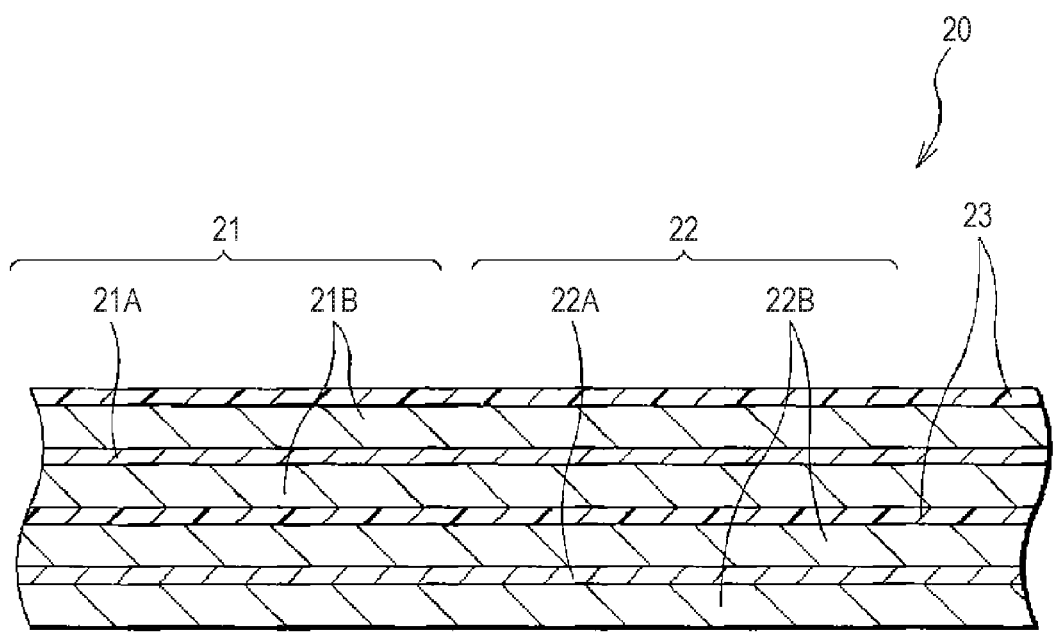
FIG. 2 is a sectional view showing enlargedly a part of a wound electrode body in the secondary battery shown in FIG. 1.

FIG. 2 shows enlargedly a part of the wound electrode body 20 shown in FIG. 1.

The positive electrode 21 has, for example, a structure in which a positive electrode active material layer 21B is provided on the both surfaces of a positive electrode collector 21A having a pair of surfaces opposing to each other. While illustration is omitted, the positive electrode active material layer 21B may be provided on only one surface of the positive electrode collector 21A. The positive electrode collector 21A is constituted of a metal foil, for example, an aluminum foil, a nickel foil, a stainless steel foil, etc.

The positive electrode active material layer 21B is constituted to contain, as a positive electrode active material, for example, a positive electrode material capable of intercalating and deintercalating lithium as an electrode reactant. Also, if desired, the positive electrode active material layer 21B may contain a conductive agent. Though it is preferable that the positive electrode active material layer 21B contains, for example, polyvinylidene fluoride as a binder, it may further contain polyacrylonitrile, a rubber based binder or the like. The polyvinylidene fluoride may be, for example, a PVDF-CTFE copolymer (vinylidene fluoride-chlorotrifluoroethylene copolymer), a PVDF-PTFE copolymer (vinylidene fluoride-polytrifluoroethylene copolymer), a polyvinylidene fluoride maleic acid modified material or the like.

As the positive electrode material capable of intercalating and deintercalating lithium, lithium-containing compounds such as a lithium oxide, a lithium sulfide, an intercalation compound containing lithium and a lithium phosphate compound are suitable. A mixture of plural kinds thereof may be used. Of these, a complex oxide containing lithium and a transition metal element or a phosphate compound containing lithium and a transition metal element is preferable; and a compound containing at least one member selected from the group consisting of cobalt (Co), nickel, manganese (Mn), iron, aluminum, vanadium (V) and titanium (Ti) as a transition metal element is especially preferable. A chemical formula thereof is represented by, for example, $Li_xMIO_2$ or $Li_yMIIPO_4$. In the formulae, each of MI and MII includes one kind or plural kinds of a transition metal element; and values of x and y vary depending upon the charge and discharge state of the battery and are usually satisfied with the relationships of ($0.05 \le x \le 1.10$) and ($0.05 \le y \le 1.10$).

Specific examples of the complex oxide containing lithium and a transition metal element include a lithium cobalt complex oxide ($Li_xCoO_2$), a lithium nickel complex oxide and a lithium manganese complex oxide having a spinel type structure ($LiMn_2O_4$). Examples of the lithium nickel complex oxide include $LiNi_xCo_{1-x}O_2$ ($0 \le x \le 1$), $Li_xNiO_2$, $LiNi_xCo_yO_2$ and $Li_{x1}Ni_{1-z}Co_zO_2$($z<1$). Specific examples of the phosphate compound containing lithium and a transition metal element include a lithium iron phosphate compound ($LiFePO_4$) and a lithium iron manganese phosphate compound (($LiFe_{1-u}Mn_uPO_4$) ($u<1$)).

As the positive electrode material capable of intercalating and deintercalating lithium, there are also exemplified other metal compound and a polymer material. Examples of other metal compound include oxides such as titanium oxide, vanadium oxide and manganese dioxide; and disulfides such as titanium sulfide and molybdenum sulfide. Examples of the polymer material include polyaniline and polythiophene.

The positive electrode active material is constituted to have a specific surface area, as measured by the $N_2$ gas BET (Brunauer-Emmett-Teller) method, falling within the range of from 0.05 to 2.0 $m^2/g$, and preferably from 0.2 to 0.7 $m^2/g$. This is because a more effective film can be formed within this range.

The positive electrode active material layer 21B may contain a conductive material, if desired. Examples of the conductive material include carbon materials such as graphite, carbon black and ketjen black, and these materials are used singly or in admixture of two or more kinds thereof. Also, in addition to the carbon material, a metal material or a conductive polymer material or the like may be used so far as it is a material having conductivity.

The negative electrode 22 has, for example, a configuration in which a negative electrode active material layer 22B is provided on the both surfaces of a negative electrode collector 22A having a pair of surfaces opposing to each other. While illustration is omitted, the negative electrode active material layer 22B may be provided on only one surface of the negative electrode collector 22A. The negative electrode collector 22A is constituted of a metal foil, for example, a copper foil, a nickel foil, a stainless steel foil, etc.

It is preferable that the negative electrode active material layer 22B contains, as a negative electrode active material, one or two or more kinds of negative electrode materials capable of intercalating and deintercalating lithium as an electrode reactant. Also, the negative electrode active material layer 22B may contain a conductive material or a binder, if desired.

Examples of the negative electrode material capable of intercalating and deintercalating lithium include carbon materials such as graphite, hardly graphitized carbon and easily graphitized carbon. Such a carbon material is preferable because a change in the crystal structure to be generated at the time of charge and discharge is very little, a high charge and discharge capacity can be obtained, and a favorable charge and discharge cycle characteristic can be obtained. The graphite may be either natural graphite or artificial graphite.

As the hardly graphitized carbon, one which has a spacing of the (002) plane of 0.37 nm or more and a true density of less than 1.70 $g/cm^3$ and which does not show an exothermic peak at 700° C. or higher in differential thermal analysis (DTA) in air is preferable.

Also, examples of the negative electrode material capable of intercalating and deintercalating lithium include a simple substance, an alloy and a compound of a metal element or a semi-metal element each capable of forming an alloy together with lithium, and such a material may be contained. Such a material is preferable because a high energy density is obtainable. In particular, the use of such a material together with a carbon material is preferable because not only is a high energy density obtainable, but an excellent charge and discharge cycle characteristic is obtainable. The "alloy" as referred to in this specification includes, in addition to alloys composed of two or more kinds of a metal element, alloys containing one or more kinds of a metal element and one or more kinds of a semi-metal element. Examples of its texture include a solid solution, a eutectic (eutectic mixture), an intermetallic compound and one in which two or more kinds thereof coexist.

Examples of the metal element or semi-metal element capable of forming an alloy together with lithium include tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of such an alloy or compound include those represented by a chemical formula: $Ma_sMb_t$. In this chemical formula, Ma represents at least one member selected from the group consisting of metal elements and semi-metal elements each capable of forming an alloy together with lithium; and Mb represents at least one member of elements other than Ma. Values of s and t are satisfied with the relationships of (s>0) and (t>0), respectively.

Above all, a simple substance, an alloy or a compound of a metal element or a semi-metal element belonging to the Group 14 in the long form of the periodic table is preferable; and silicon or tin, or an alloy or a compound thereof is especially preferable. Such a material may be either crystalline or amorphous.

Specific examples of such an alloy or compound include $LiAl$, $AlSb$, $CuMgSb$, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $CuSSi$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ (0<v≤2), $SnO_w$ (0<w≤2), $SnSiO_3$, $LiSiO$ and $LiSnO$.

Examples of the binder include synthetic rubbers such as a styrene-butadiene based rubber, a fluorocarbon based rubber and an ethylene-propylene-diene rubber; and polymer materials such as polyvinylidene fluoride. These materials are used singly or in admixture of two or more kinds thereof.

The separator 23 partitions the positive electrode 21 and the negative electrode 22 from each other and allows a lithium ion to pass therethrough while preventing a short circuit of the current to be caused due to the contact of the both electrodes. The separator 23 is constituted of, for example, a porous film made of a synthetic resin such as polytetrafluoroethylene, polypropylene and polyethylene or a porous film made of a ceramic. The separator 23 may also have a structure in which two or more kinds of such porous films are laminated. Above all, a polyolefin-made porous film is preferable because it is excellent in an effect for preventing a short circuit from occurring and is able to contrive to enhance the safety of the battery due to a shutdown effect. In particular, polyethylene is preferable as a material constituting the separator 23 because not only is it able to obtain a shutdown effect at a temperature of from 100 to 160° C., but it is excellent in electrochemical stability. Also, polypropylene is preferable. Besides, a resin may be used upon being copolymerized or blended with polyethylene or polypropylene so far as it is provided with chemical stability.

A nonaqueous electrolyte is impregnated in the separator 23.

This secondary battery can be, for example, manufactured in the following manner.

As to the positive electrode, first of all, for example, polyvinylidene fluoride is dispersed in a solvent such as N-methyl-2-pyrrolidone. Subsequently, this mixed solution is mixed with a positive electrode active material and a conductive agent and the foregoing inorganic phosphorus compound, if desired, thereby forming a positive electrode mixture slurry in a paste form. There is thus prepared a positive electrode mixture coating solution. Subsequently, this positive electrode mixture coating solution is coated on the positive electrode collector 21A, and the solvent is then dried. Thereafter, the resultant is compression molded by a roll press or the like to form the positive electrode active material layer 21B. There is thus prepared the positive electrode 21. The positive electrode active material layer 21B may also be formed by sticking the positive electrode mixture onto the positive electrode collector 21A.

Also, for example, a carbon based material as a negative electrode active material and a binder are mixed to prepare a negative electrode mixture. This negative electrode mixture is dispersed in a solvent such as N-methyl-2-pyrrolidone to form a negative electrode mixture slurry in a paste form. There is thus prepared a negative electrode mixture coating solution. Subsequently, this negative electrode mixture coating solution is coated on the negative electrode collector 22A, and the solvent is then dried. Thereafter, the resultant is compression molded by a roll press or the like to form the negative electrode active material layer 22B. There is thus prepared the negative electrode 22. The negative electrode active material layer 22B may also be formed by sticking the negative electrode mixture onto the negative electrode collector 22A.

Subsequently, the positive electrode lead 25 is installed in the positive electrode collector 21A by means of welding or the like, and the negative electrode lead 26 is also installed in the negative electrode collector 22A by means of welding or the like. Thereafter, the positive electrode 21 and the negative electrode 22 are wound via the separator 23; a tip end of the positive electrode lead 25 is welded with the safety valve mechanism 15; and a tip end of the negative electrode lead 26 is welded with the battery can 11. The wound positive electrode 21 and negative electrode 22 are interposed between a pair of the insulating plates 12 and 13 and housed in the inside of the battery can 11. After housing the positive electrode 21 and the negative electrode 22 in the inside of the battery can 11, an electrolytic solution containing a sulfone compound is injected into the inside of the battery can 11 and impregnated in the separator 23. Thereafter, the battery lid 14, the safety valve mechanism 15 and the positive temperature coefficient device 16 are fixed to the open end of the battery can 11 upon being caulked via the gasket 17. There is thus completed the secondary battery shown in FIG. 1.

In this secondary battery, when charged, for example, a lithium ion is deintercalated from the positive electrode active material layer 21B and intercalated in the negative electrode active material layer 22B via the electrolytic solution. Also, when discharged, for example, a lithium ion is deintercalated from the negative electrode active material layer 22B and intercalated in the positive electrode active material layer 21B via the electrolytic solution.

Also, in the foregoing embodiment, the secondary battery of a cylinder type having a winding structure has been specifically described. However, the present embodiment is similarly applicable to a secondary battery of an oval type or a polygonal type each having a winding structure, or a secondary battery having other shape in which a positive electrode and a negative electrode are folded, or plural positive electrodes and negative electrodes are laminated. In addition, the present invention is similarly applicable to secondary batteries having other shape such as a coin type, a button type, a square type and a laminated film type.

Moreover, in the foregoing embodiment, the case of using an electrolytic solution in a liquid form as the nonaqueous electrolyte has been described. However, a nonaqueous electrolyte in a gel form in which an electrolytic solution is held in a holding body such as a polymer compound may be used. Examples of such a polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. In particular, polyacrylonitrile, polyvinylidene fluoride, polyhexafluoropropylene and polyethylene oxide are preferable in view of electrochemical stability. A proportion of the polymer compound to the electrolytic solution varies with compatibility therebetween. In general, it is preferable that the polymer compound is added in an amount corresponding to 5% by mass or more and not more than 50% by mass in the electrolytic solution.

EXAMPLES

Specific working examples are hereunder described in detail.

Examples 1-1 to 1-7 and Comparative Examples 1-1 to 1-7

The secondary battery of a cylinder type as shown in FIGS. 1 and 2 was prepared.

Lithium cobaltate (LiCoO$_2$) having an accumulated 50% (on a volume basis) primary particle size (median particle size) obtained by the laser diffraction method of 12 μm was used as a positive electrode active material. Subsequently, as to a positive electrode, a mixed solution prepared by well dispersing 3.0% by mass (on a positive electrode mixture basis) of polyvinylidene fluoride in N-methyl-2-pyrrolidone was mixed with 94% by mass (on a positive electrode mixture basis) of the lithium cobaltate powder and 3% by mass (on a positive electrode mixture basis) of ketjen black as a conductive material, to which was then added phosphorous acid P(OH)$_3$ in each of Examples 1-1 to 1-4 and 1-7 and Comparative Examples 1-3, 1-6 and 1-7, phosphoric acid P(=O)(OH)$_3$ in Example 1-5 and phosphonic acid P(=O)H(OH)$_2$ in Example 1-6, respectively, thereby forming positive electrode mixture coating solutions. Here, the positive electrode mixture is the total sum of polyvinylidene fluoride, lithium cobaltate and the conductive material.

Subsequently, each of these positive electrode mixture coating solutions was uniformly coated on the both surfaces of the positive electrode collector 21A made of a strip-shaped aluminum foil having a thickness of 20 μm and then dried. Thereafter, the resultant was compression molded to form the positive electrode active material layer 21B, thereby preparing the positive electrode 21. On that occasion, a thickness of one surface of the positive electrode active material layer 21B was set up at 80 μm. Thereafter, the positive electrode lead 25 made of aluminum was installed in one end of the positive electrode collector 21A.

Also, 95% by mass (on a negative electrode mixture basis) of a granular graphite powder made of a mesophase small sphere having a lattice spacing d$_{002}$ in the C-axis direction calculated in the X-ray diffraction of 0.336 nm and a median particle size of 15.6 μm as a negative electrode active material and 5.0% by mass (on a negative electrode mixture basis) of polyvinylidene fluoride as a binder were mixed, and the mixture was dispersed in N-methyl-2-pyrrolidone as a solvent to prepare a negative electrode mixture coating solution. Here, the negative electrode mixture is the total sum of the graphite powder and polyvinylidene fluoride.

Subsequently, this negative electrode mixture coating solution was uniformly coated on the both surfaces of the negative electrode collector 22A made of a strip-shaped copper foil having a thickness of 15 μm and then dried. The resultant was compression molded to form the negative electrode active material layer 22B, thereby preparing the negative electrode 22. On that occasion, a thickness of one surface of the negative electrode active material layer 22B was set up at 52 μm. Subsequently, the negative electrode lead 26 made of nickel was installed in three areas in one end of the negative electrode collector 22A.

After preparing the positive electrode 21 and the negative electrode 22, respectively, the positive electrode 21 and the negative electrode 22 were laminated via the separator 23 made of a microporous polyethylene stretched film having a thickness of 18 μm in the order of the negative electrode 22, the separator 23, the positive electrode 21 and the separator 23. The resulting laminate was wound many times, thereby preparing the wound electrode body 20 of a jelly roll type. Subsequently, the wound electrode body 20 was interposed between a pair of the insulating plates 12 and 13; not only the negative electrode lead 26 was welded with the battery can 11, but the positive electrode lead 25 was welded with the safety valve mechanism 15; and the wound electrode body 20 was then housed in the inside of the battery can 11. Subsequently, an electrolytic solution was injected into the inside of the battery can 11, and the battery lid 14 was caulked with the battery can 11 via the gasket 17, thereby preparing a secondary battery of a cylinder type.

A solution prepared by dissolving lithium hexafluorophosphate as an electrolyte salt in a proportion of 1.28 moles/kg in a mixed solvent of ethylene carbonate (EC), dimethyl carbonate (DMC) and propylene carbonate (PC) in a proportion of 20/70/10 (by mass) was used as the electrolytic solution. On that occasion, a sulfone compound shown in the following Table 1 was added or not added as an additive. In Examples 1-1 to 1-4, the sulfone compound was changed as shown below.

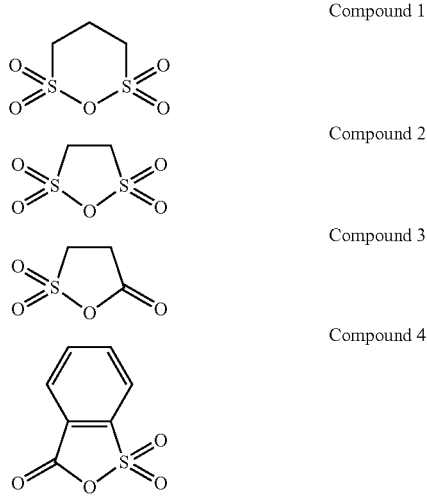

Compound 1

Compound 2

Compound 3

Compound 4

(Measurement of Capacity Retention Rate)

Each of the thus prepared lithium ion secondary batteries of Examples 1-1 to 1-7 and Comparative Examples 1-1 to 1-7 was subjected to a floating test at 55° C. and examined with respect to a capacity retention rate after a lapse of 2,000 hours. First of all, the charge was performed at a constant current of 1 C until a battery voltage reached 4.2 V and then performed at a constant voltage of 4.2 V, thereby making it in a floating state. Each of the battery after a lapse of one hour and the battery after a lapse of 2,000 hours was discharged at a constant current of 1 C; the discharge was completed at the point of time when the battery voltage reached 3.0 V; and a discharge capacity was measured. A capacity retention rate after a lapse of 2,000 hours was determined according to an expression of [{(battery capacity after a lapse of 2,000 hours)/(battery capacity after a lapse of one hour)}×100].

parative Examples 1-1 to 1-3 that when the inorganic phosphorus compound is coated on the surface of the positive electrode active material, though the generation of a gas can be suppressed, the own elution of cobalt from the active material cannot be substantially suppressed. The deterioration in a battery capacity in a charging atmosphere can be classified into two factors of the elution of a metal from the active material and the generation of a gas from the electrolytic solution, and the deterioration can be suppressed first by the sulfone compound in the electrolytic solution and the inorganic phosphorus compound on the surface part of the positive electrode active material each of which reveals an effect for each of the factors. Also, it was noted from Comparative Examples 1-4 to 1-7 that even when the

TABLE 1

| | Positive electrode active material | Inorganic phosphorus compound | | Solvent | Sulfone compound | | Capacity retention rate after a lapse of 2,000 hours in a floating state at 55° C. |
|---|---|---|---|---|---|---|---|
| | Kind | Kind | % by mass | Kind | Kind | % by mass | (%) |
| Example 1-1 | LiCoO$_2$ | Phosphorous acid | 0.5 | EC/DMC/PC (20/70/10) | Compound 1 | 0.5 | 91 |
| Example 1-2 | LiCoO$_2$ | Phosphorous acid | 0.5 | EC/DMC/PC (20/70/10) | Compound 2 | 0.5 | 89 |
| Example 1-3 | LiCoO$_2$ | Phosphorous acid | 0.5 | EC/DMC/PC (20/70/10) | Compound 3 | 0.5 | 90 |
| Example 1-4 | LiCoO$_2$ | Phosphorous acid | 0.5 | EC/DMC/PC (20/70/10) | Compound 4 | 0.5 | 90 |
| Example 1-5 | LiCoO$_2$ | Phosphoric acid | 0.5 | EC/DMC/PC (20/70/10) | Compound 1 | 0.5 | 83 |
| Example 1-6 | LiCoO$_2$ | Phosphonic acid | 0.5 | EC/DMC/PC (20/70/10) | Compound 1 | 0.5 | 90 |
| Example 1-7 | LiCoO$_2$ | Phosphorous acid | 0.1 | EC/DMC/PC (20/70/10) | Compound 1 | 0.1 | 68 |
| Comparative Example 1-1 | LiCoO$_2$ | — | — | EC/DMC/PC (20/70/10) | — | — | 18 |
| Comparative Example 1-2 | LiCoO$_2$ | — | — | EC/DMC/PC (20/70/10) | Compound 1 | 0.5 | 64 |
| Comparative Example 1-3 | LiCoO$_2$ | Phosphorous acid | 0.5 | EC/DMC/PC (20/70/10) | — | — | 35 |
| Comparative Example 1-4 | LiCoO$_2$ | — | — | EC/DMC/PC (20/70/10) | Compound 1 | 1.0 | 68 |
| Comparative Example 1-5 | LiCoO$_2$ | — | — | EC/DMC/PC (20/70/10) | Compound 1 | 1.5 | 66 |
| Comparative Example 1-6 | LiCoO$_2$ | Phosphorous acid | 1.0 | EC/DMC/PC (20/70/10) | — | — | 39 |
| Comparative Example 1-7 | LiCoO$_2$ | Phosphorous acid | 1.5 | EC/DMC/PC (20/70/10) | — | — | 37 |

As shown in Table 1, in Examples 1-1 to 1-6, the capacity retention rate could be conspicuously enhanced as compared with that in Comparative Example 1-3 in which the sulfone compound was not added. It may be considered that this result was caused due to the fact that by adding the sulfone compound, a stable film was formed on the surface of the active material, whereby the elution of a metal could be suppressed in a charging atmosphere. In Examples 1-1 to 1-6, the capacity retention rate could be conspicuously enhanced as compared with that in Comparative Example 1-2 in which the inorganic phosphorus compound was not coated on the surface of the positive electrode active material. It may be considered that this result was caused due to the fact that the inorganic phosphorus compound was located on the surface of the positive electrode active material, whereby the generation of a gas to be caused due to decomposition of the electrolytic solution could be suppressed in a charging atmosphere. It was noted from Comaddition amount of each of the sulfone compound and the inorganic phosphorus compound is increased alone, the characteristics are not significantly enhanced and do not become equal to the characteristics due to a combination of the sulfone compound and the inorganic phosphorus compound. Also, from Example 1-7, there was brought an effect that when phosphorous acid is used in combination with the sulfone compound, a film with good quality is obtained, and even when these compounds are used in smaller amounts, results which are equal to or more than those in the case of single use of each of them are revealed.

Examples 2-1 to 2-6

In Examples 2-1 to 2-6, secondary batteries of a cylinder type were prepared in the same manner as in Example 1-1, except for changing the addition amount of the sulfone compound (Compound 1).

TABLE 2

| | Positive electrode active material | Inorganic phosphorus compound | | Solvent | Sulfone compound | | Capacity retention rate after a lapse of 2,000 hours in a floating state at 55° C. |
|---|---|---|---|---|---|---|---|
| | Kind | Kind | % by mass | Kind | Kind | % by mass | (%) |
| Example 2-1 | LiCoO$_2$ | Phosphorous acid | 0.5 | EC/DMC/PC (20/70/10) | Compound 1 | 0.005 | 68 |
| Example 2-2 | LiCoO$_2$ | Phosphorous acid | 0.5 | EC/DMC/PC (20/70/10) | Compound 1 | 0.01 | 81 |
| Example 2-3 | LiCoO$_2$ | Phosphorous acid | 0.5 | EC/DMC/PC (20/70/10) | Compound 1 | 0.1 | 90 |
| Example 1-1 | LiCoO$_2$ | Phosphorous acid | 0.5 | EC/DMC/PC (20/70/10) | Compound 1 | 0.5 | 91 |
| Example 2-4 | LiCoO$_2$ | Phosphorous acid | 0.5 | EC/DMC/PC (20/70/10) | Compound 1 | 0.8 | 87 |
| Example 2-5 | LiCoO$_2$ | Phosphorous acid | 0.5 | EC/DMC/PC (20/70/10) | Compound 1 | 1.0 | 80 |
| Example 2-6 | LiCoO$_2$ | Phosphorous acid | 0.5 | EC/DMC/PC (20/70/10) | Compound 1 | 1.5 | 64 |
| Comparative Example 1-3 | LiCoO$_2$ | Phosphorous acid | 0.5 | EC/DMC/PC (20/70/10) | — | — | 35 |

In Examples 2-1 to 2-6, a favorable enhancement in the charge retention rate could be confirmed by the addition of the sulfone compound. When the addition amount of the sulfone compound is too small, an effect for forming a sufficient film on the positive electrode surface is low; whereas when the addition amount is too large, the film on the positive electrode surface becomes excessively thick, and therefore, the influence by a lowering in the capacity retention rate due to an increase of the interfacial resistance is larger than that by a lowering in the capacity retention rate due to the elution of cobalt. According to this, it was noted that an optimal addition amount of the sulfone compound is in the range of from 0.01% by mass to 1.0% by mass, and moreover in the range of from 0.1% by mass to 0.8% by mass.

Examples 3-1 to 3-6

In Examples 3-1 to 3-6, secondary batteries of a cylinder type were prepared in the same manner as in Example 1-1, except for changing the addition amount of phosphorous acid.

TABLE 3

| | Positive electrode active material | Inorganic phosphorus compound | | Solvent | Sulfone compound | | Capacity retention rate after a lapse of 2,000 hours in a floating state at 55° C. |
|---|---|---|---|---|---|---|---|
| | Kind | Kind | % by mass | Kind | Kind | % by mass | (%) |
| Example 3-1 | LiCoO$_2$ | Phosphorous acid | 0.005 | EC/DMC/PC (20/70/10) | Compound 1 | 0.5 | 72 |
| Example 3-2 | LiCoO$_2$ | Phosphorous acid | 0.01 | EC/DMC/PC (20/70/10) | Compound 1 | 0.5 | 82 |
| Example 3-3 | LiCoO$_2$ | Phosphorous acid | 0.1 | EC/DMC/PC (20/70/10) | Compound 1 | 0.5 | 88 |
| Example 1-1 | LiCoO$_2$ | Phosphorous acid | 0.5 | EC/DMC/PC (20/70/10) | Compound 1 | 0.5 | 91 |
| Example 3-4 | LiCoO$_2$ | Phosphorous acid | 0.8 | EC/DMC/PC (20/70/10) | Compound 1 | 0.5 | 86 |
| Example 3-5 | LiCoO$_2$ | Phosphorous acid | 1.0 | EC/DMC/PC (20/70/10) | Compound 1 | 0.5 | 79 |
| Example 3-6 | LiCoO$_2$ | Phosphorous acid | 1.5 | EC/DMC/PC (20/70/10) | Compound 1 | 0.5 | 70 |
| Comparative Example 1-2 | LiCoO$_2$ | — | — | EC/DMC/PC (20/70/10) | Compound 1 | 0.5 | 64 |

In Examples 3-1 to 3-6, a favorable enhancement in the charge retention rate could be confirmed by coating with phosphorous acid. When the addition amount of phosphorous acid is too small, an effect for suppressing the generation of a gas occurred on the positive electrode surface is low; whereas when the addition amount is too large, the influence by a lowering in the capacity retention rate due to an increase of the interfacial resistance is larger than that by a lowering in the capacity retention layer due to the generation of a gas. According to this, it was noted that an optimal addition amount of phosphorous acid is in the range of from 0.01% by mass to 1.0% by mass, and moreover in the range of from 0.1% by mass to 0.8% by mass.

Examples 4-1 to 4-5 and Comparative Examples 4-1 to 4-5

Secondary batteries of a cylinder type were prepared in the same manner as in Example 1-1, except for changing the kind of the positive electrode active material.

TABLE 4

| | Positive electrode active material | Inorganic phosphorus compound | | Solvent | Sulfone compound | | Capacity retention rate after a lapse of 2,000 hours in a floating state at 55° C. |
|---|---|---|---|---|---|---|---|
| | Kind | Kind | % by mass | Kind | Kind | % by mass | (%) |
| Example 1-1 | $LiCoO_2$ | Phosphorous acid | 0.5 | EC/DMC/PC (20/70/10) | Compound 1 | 0.5 | 91 |
| Example 4-1 | $LiFePO_4$ | Phosphorous acid | 0.5 | EC/DMC/PC (20/70/10) | Compound 1 | 0.5 | 95 |
| Example 4-2 | $LiCo_{0.15}Ni_{0.8}Al_{0.05}O_2$ | Phosphorous acid | 0.5 | EC/DMC/PC (20/70/10) | Compound 1 | 0.5 | 92 |
| Example 4-3 | $LiCo_{0.33}Ni_{0.33}Mn_{0.33}O_2$ | Phosphorous acid | 0.5 | EC/DMC/PC (20/70/10) | Compound 1 | 0.5 | 91 |
| Example 4-4 | $LiCo_{0.2}Ni_{0.5}Mn_{0.3}O_2$ | Phosphorous acid | 0.5 | EC/DMC/PC (20/70/10) | Compound 1 | 0.5 | 91 |
| Example 4-5 | $LiCoO_2$ (80)/ $LiCo_{0.2}Ni_{0.5}Mn_{0.3}O_2$ (20) | Phosphorous acid | 0.5 | EC/DMC/PC (20/70/10) | Compound 1 | 0.5 | 92 |
| Comparative Example 1-1 | $LiCoO_2$ | — | — | EC/DMC/PC (20/70/10) | — | — | 18 |
| Comparative Example 4-1 | $LiFePO_4$ | — | — | EC/DMC/PC (20/70/10) | — | — | 42 |
| Comparative Example 4-2 | $LiCo_{0.15}Ni_{0.8}Al_{0.05}O_2$ | — | — | EC/DMC/PC (20/70/10) | — | — | 31 |
| Comparative Example 4-3 | $LiCo_{0.33}Ni_{0.33}Mn_{0.33}O_2$ | — | — | EC/DMC/PC (20/70/10) | — | — | 28 |
| Comparative Example 4-4 | $LiCo_{0.2}Ni_{0.5}Mn_{0.3}O_2$ | — | — | EC/DMC/PC (20/70/10) | — | — | 26 |
| Comparative Example 4-5 | $LiCoO_2$ (80)/ $LiCo_{0.2}Ni_{0.5}Mn_{0.3}O_2$ (20) | — | — | EC/DMC/PC (20/70/10) | — | — | 24 |

From the results of Table 4, an effect for suppressing the deterioration of the capacity could be confirmed even by using any of the foregoing positive electrode materials.

Examples 5-1 to 5-2 and Comparative Examples 5-1 to 5-2

Secondary batteries of a cylinder type were prepared in the same manner as in Example 1-1, except for changing the type of the solvent of the electrolytic solution.

TABLE 5

| | Positive electrode active material | Inorganic phosphorus compound | | Solvent | Sulfone compound | | Capacity retention rate after a lapse of 2,000 hours in a floating state at 55° C. |
|---|---|---|---|---|---|---|---|
| | Kind | Kind | % by mass | Kind | Kind | % by mass | (%) |
| Example 1-1 | $LiCoO_2$ | Phosphorous acid | 0.5 | EC/DMC/PC (20/70/10) | Compound 1 | 0.5 | 91 |
| Example 5-1 | $LiCoO_2$ | Phosphorous acid | 0.5 | EC/DMC/PC/FEC (20/60/10/10) | Compound 1 | 0.5 | 93 |
| Example 5-2 | $LiCoO_2$ | Phosphorous acid | 0.5 | EC/DMC/PC/FEC (20/60/9/1) | Compound 1 | 0.5 | 93 |

TABLE 5-continued

|  | Positive electrode active material | Inorganic phosphorus compound | | Solvent | Sulfone compound | | Capacity retention rate after a lapse of 2,000 hours in a floating state at 55° C. |
| --- | --- | --- | --- | --- | --- | --- | --- |
|  | Kind | Kind | % by mass | Kind | Kind | % by mass | (%) |
| Comparative Example 1-1 | LiCoO$_2$ | — | — | EC/DMC/PC (20/70/10) | — | — | 18 |
| Comparative Example 5-1 | LiCoO$_2$ | — | — | EC/DMC/PC/FEC (20/60/10/10) | — | — | 21 |
| Comparative Example 5-2 | LiCoO$_2$ | — | — | EC/DMC/PC/FEC/VC (20/60/10/9/1) | — | — | 26 |

From the results of Table 5, an effect for suppressing the deterioration of the capacity could be confirmed even by using any of the foregoing electrolytic solutions.

Examples 6-1 to 6-2 and Comparative Examples 6-1 to 6-2

The kind of the negative electrode active material was changed. In Example 6-1 and Comparative Example 6-1, a negative electrode active material containing tin as the first constitutional element was synthesized while utilizing a mechanochemical reaction. A composition of the obtained negative electrode active material powder was analyzed. A content of carbon was measured by a carbon/sulfur analyzer, and a content of each of other elements was measured by means of ICP (inductively coupled plasma) emission spectrometry. The obtained results are shown in parentheses in the column of the negative electrode active material of the following Table 6. The numerals shown upon being punctuated with a slash within the parenthesis respectively express the contents (% by mass) of the foregoing elements in order. Subsequently, 80 parts by mass of the obtained negative electrode active material powder, 11 parts by mass of graphite (KS-15, manufactured by Lonza) and 1 part by mass of acetylene black as a conductive material and 8 parts by mass of polyvinylidene fluoride as a binder were mixed, and the mixture was dispersed in N-methyl-2-pyrrolidone as a solvent, thereby forming a negative electrode mixture slurry. Subsequently, this negative electrode mixture slurry was uniformly coated on the both surfaces of the negative electrode collector 22A made of a strip-shaped copper foil having a thickness of 10 μm and then dried. The resultant was compression molded under a fixed pressure to form the negative electrode active material layer 22B. There was thus prepared the negative electrode 22. Thereafter, the negative electrode lead 26 made of nickel was installed in one end of the negative electrode collector 22A.

Also, in Example 6-2 and Comparative Example 6-2, the negative electrode active material layer 22B made of silicon was formed on the negative electrode collector 22A by means of vapor deposition with electron beams and then subjected to a heating treatment, thereby preparing the negative electrode 22. Secondary batteries of a cylinder type were prepared in the same manner as in Example 1-1 and Comparative Example 1-1, except for changing the kind of the negative electrode active material.

TABLE 6

|  | Positive electrode active material | Inorganic phosphorus compound | | Solvent | Negative electrode active material | Sulfone compound | | Capacity retention rate after a lapse of 2,000 hours in a floating state at 55° C. |
| --- | --- | --- | --- | --- | --- | --- | --- | --- |
|  | Kind | Kind | % by mass | Kind | Kind | Kind | % by mass | (%) |
| Example 1-1 | LiCoO$_2$ | Phosphorous acid | 0.5 | EC/DMC/PC (20/70/10) | Graphite | Compound 1 | 0.5 | 91 |
| Example 6-1 | LiCoO$_2$ | Phosphorous acid | 0.5 | EC/DMC/PC (20/70/10) | Sn—Co—C (50/29.4/19.6) | Compound 1 | 0.5 | 76 |
| Example 6-2 | LiCoO$_2$ | Phosphorous acid | 0.5 | EC/DMC/PC (20/70/10) | Si | Compound 1 | 0.5 | 72 |
| Comparative Example 1-1 | LiCoO$_2$ | — | — | EC/DMC/PC (20/70/10) | Graphite | — | — | 18 |
| Comparative Example 6-1 | LiCoO$_2$ | — | — | EC/DMC/PC (20/70/10) | Sn—Co—C (50/29.4/19.6) | — | — | 14 |
| Comparative Example 6-2 | LiCoO$_2$ | — | — | EC/DMC/PC (20/70/10) | Si | — | — | 8 |

From the results of Table 6, an effect for suppressing the deterioration of the capacity could be confirmed even by using any of the foregoing negative electrode active materials.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A nonaqueous electrolyte secondary battery comprising:
    a positive electrode having a positive electrode active material layer prepared from a positive electrode mixture coating solution and provided on a positive electrode collector,
    negative electrode having a negative electrode active material layer provided on a negative electrode collector;
    a nonaqueous electrolyte including at least one member selected from the group consisting of sulfone compounds represented by the following formulae (1) and (2):

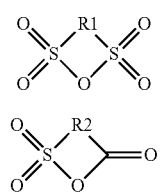
    (1)
    (2)

wherein R1 represents $C_mH_{2m-n1}X_{n2}$; X represents a halogen; m represents an integer of from 2 to 7; each of n1 and n2 independently represents an integer of from 0 to 2m; R2 represents $C_jH_{2j-k1}Z_{k2}$; Z represents a halogen; j represents an integer of from 2 to 7; each of k1 and k2 independently represents an integer of from 0 to 2j; and
    wherein the positive electrode mixture coating solution includes a positive electrode active material and an inorganic phosphorus compound represented by the following formula (3-1) or (3-2):

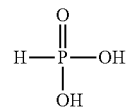
(3-1)

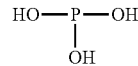
(3-2)

wherein the inorganic phosphorus compound being provided on the surface of the positive electrode active material,
    wherein the inorganic phosphorus compound is in an amount of from 0.01 to 1.0% by mass relative to the positive electrode mixture coating solution that includes the positive electrode active material, and
    wherein the positive active material layer includes $LiCoO_2$.

2. The nonaqueous electrolyte secondary battery according to claim 1, wherein the sulfone compound represented by the formula (1) is a compound represented by the following formula

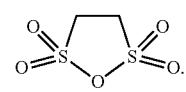
(1)

3. The nonaqueous electrolyte secondary battery according to claim 1, wherein a content of the sulfone compound in the nonaqueous electrolyte is from 0.01 to 1.0% by mass relative to the nonaqueous electrolyte.

* * * * *